(12) United States Patent
Toskala

(10) Patent No.: US 8,009,652 B2
(45) Date of Patent: Aug. 30, 2011

(54) INFORMATION TRANSMISSION IN A COMMUNICATIONS SYSTEM

(75) Inventor: Antti Toskala, Espoo (FI)

(73) Assignee: Nokia Corporation (FI)

( * ) Notice: Subject to any disclaimer, the term of this patent is extended or adjusted under 35 U.S.C. 154(b) by 606 days.

(21) Appl. No.: 10/927,489

(22) Filed: Aug. 27, 2004

(65) Prior Publication Data

US 2005/0281244 A1 Dec. 22, 2005

(30) Foreign Application Priority Data

Jun. 21, 2004 (FI) ..................................... 20040865

(51) Int. Cl.
*H04B 7/216* (2006.01)
(52) U.S. Cl. .................... 370/342; 455/560; 455/561
(58) Field of Classification Search .............. 455/452.2, 455/560–561; 370/342
See application file for complete search history.

(56) References Cited

U.S. PATENT DOCUMENTS

| | | | | |
|---|---|---|---|---|
| 5,428,668 | A * | 6/1995 | Dent et al. ................. | 455/452.1 |
| 6,374,112 | B1 * | 4/2002 | Widegren et al. .......... | 455/452.2 |
| 6,728,238 | B1 * | 4/2004 | Long et al. .................. | 370/352 |
| 2003/0099255 | A1 * | 5/2003 | Kekki et al. .................. | 370/469 |
| 2003/0101274 | A1 | 5/2003 | Yi et al. | |
| 2003/0123396 | A1 | 7/2003 | Seo et al. | |
| 2003/0203736 | A1 | 10/2003 | Chi et al. | |
| 2003/0210660 | A1 * | 11/2003 | Wiberg et al. ................ | 370/320 |
| 2004/0022213 | A1 | 2/2004 | Choi et al. | |
| 2004/0106430 | A1 * | 6/2004 | Schwarz et al. ............ | 455/552.1 |
| 2004/0110473 | A1 | 6/2004 | Rudolf et al. | |
| 2004/0132453 | A1 * | 7/2004 | Gabriel et al. ................ | 455/446 |
| 2004/0198370 | A1 * | 10/2004 | Braun et al. ................ | 455/452.2 |
| 2005/0226267 | A1 * | 10/2005 | Pedersen et al. ............. | 370/465 |

FOREIGN PATENT DOCUMENTS

| | | |
|---|---|---|
| JP | 2003-309879 | 10/2003 |
| WO | WO 03/096553 A2 | 11/2003 |
| WO | WO 03/096571 A1 | 11/2003 |
| WO | WO 03/107707 A1 | 12/2003 |

OTHER PUBLICATIONS

3rd Generation Partnership Project; Technical Specification Group Radio Access Network; High Speed Downlink Packet Access (HSDPA); Overall Description; Stage 2 (Release 5) (V5.5.0) (Mar. 2004).
Toskala et al., WCDMA for UMTS ; "High-speed Downlink Packet Access" (pp. 279-304) (2002).
3GPP TR 25.933 V5.4.0, "Technical Specification Group Radio Access Network; IP Transport in UTRAN", (Dec. 2003), Release 5, pp. 17, 71, 72, 77, and 78.
The International Search Report for PCT Application No. PCT/FI2005/000281; Filed Jun. 15, 2005; Date of Completion Oct. 11, 2005; Date of Mailing Oct. 13, 2005.
The Written Opinion for PCT Application No. PCT/FI2005/000281; Filed Jun. 15, 2005; Date of Completion Oct. 11, 2005; Date of Mailing Oct. 13, 2005.

* cited by examiner

*Primary Examiner* — Lester Kincaid
*Assistant Examiner* — Steven Lim
(74) *Attorney, Agent, or Firm* — Alston & Bird LLP

(57) ABSTRACT

A method for transmitting information between a control network element and a transceiver network element in a communications system is discussed. A first connection and a second connection connecting the control network element and the transceiver network element are provided. The first connection has a higher guaranteed quality of service than the second connection. A piece of information is transmitted using the first connection or the second connection using a predetermined criterion.

34 Claims, 6 Drawing Sheets

INFORMATION TRANSMISSION IN A COMMUNICATIONS SYSTEM

FIELD OF THE INVENTION

The present invention relates to transmitting information in a communications system. In particular, the present invention relates to transmitting information between a control network element and a transceiver network element.

BACKGROUND OF THE INVENTION

A communications system can be seen as a facility that enables communication between two or more entities such as user equipment and/or other nodes associated with the system. The communication may comprise, for example, communication of voice, data, multimedia and so on. The communications system may be circuit switched or packet switched. The communication system may be configured to provide wireless communication.

One example of a communications system is a cellular communications system. The coverage area of a cellular communications system is divided into cells. In general, user mobility is supported by re-routing connections (calls) to the transceiver network element corresponding to the cell where the user with his communications device is currently located. One example of a second generation cellular communications system is the Global System for Mobile telecommunications (GSM), and one example of a third generation cellular communications system is the Wideband CDMA (code division multiple access) system.

Traditionally, cellular communications systems have been circuit-switched systems. Some second generation cellular communications systems and many third generation cellular communication systems support both circuit-switched and packet-switched communications. The volume of packet-switched communications is increasing, so it is important to provide in cellular communications system capacity for transmitting packet-switched data.

One feature relating to packet-switched traffic is that this traffic is often asymmetric. As an example, consider a user browsing in the Internet. There is typically much more packet-switched traffic towards the user than in the opposite direction, that is, from the user towards a server in the Internet. Thus, in addition to supporting packet-switched data, there is need to support asymmetric packet-switched traffic in a communications system.

In the Wideband CDMA (WCDMA) system, one solution to support packet-switched traffic towards the communications devices is the High Speed Downlink Packet Access (HSDPA). HSDPA involves a new physical channel at the radio interface between the WCDMA system and a communications device. The HSDPA physical channel is shared by the communications devices using HSDPA. The HSDPA physical channel is separate from other WCDMA channels, and it increases the downlink packet-data transmission capacity of the WCDMA system at the radio interface.

The maximum data rate for the shared HSDPA channel is 10 Mbits per second. This data rate is about five times higher than data rates supported by other channels in the WCDMA system. As the transmission capacity at the radio interface increases, the transmission capacity within the WCDMA system needs to be also increased.

FIG. 1 shows schematically downlink packet data communications in a cellular communications system 100. A transceiver network element 110 providing communications over a radio interface to a communications device 101 is connected to a control network element 120. Several transceiver network elements are typically connected to one control network element. The control network element 120 is, in turn, connected to a core packet network 130 of the cellular communications system 100. In a WCDMA system, the transceiver network elements are called base stations or Node B's and the control network elements are called Radio Network Controllers.

The transceiver network element 110 is often connected to the control network element 120 by a fixed connection 112 provided by a transmission network 140. A transmission network provides fixed connections between endpoints. A fixed connection refers here to transmission capacity which is reserved for the specific connection independently of whether there is data to transmit over the connection. A fixed connection provided by a transmission network is also often called a leased line. The transmission network 140 may be implemented using, for example a plesiochronous digital hierarchy (PDH) or synchronous digital hierarchy (SDH). In a PDH transmission network, a common basic data transfer rate is 2,048 Mbit per second, and a fixed connection having this basic data transfer rate is called an E1 connection. For supporting speech connections to and from communications devices using the communications system 100, an E1 connection connecting the transceiver network element to the control network element, or vice versa, is generally divided in to 30×64 kbits/second channels plus 2×64 kbit/second channels for signaling and synchronization. It is alternatively possible to divide the capacity of an E1 connection, or the capacity of another type of leased line, between a number of connections/users in a different way.

To increase data transmission capacity between the control network element 120 and the transceiver network element 110 a common solution is to provide a plurality of leased line connections, for example a plurality of E1 connections. This may, however, prove not to be a feasible cost-effective solution for providing transmission capacity for the HSDPA downlink packet-data traffic, especially-if the maximum capacity for the HSDPA downlink data traffic is needed only occasionally.

It is appreciated that although the HSDPA and the WCDMA system as discussed above in detail, similar problems may arise in other communications systems.

Embodiments of the present invention aim to provide a feasible solution for providing data transmission capacity in a communications systems.

SUMMARY OF THE INVENTION

A first aspect of the present invention relates to a method for transmitting information between a control network element and a transceiver network element in a communications system, said method comprising
  providing a first connection connecting the control network element and the transceiver network element,
  providing a second connection connecting the control network element and the transceiver network element, the first connection having a higher guaranteed quality of service than the second connection, and
  transmitting a piece of information using the first connection or the second connection using a predetermined criterion.

A second aspect of the present invention relates to a communications system comprising at least one control network element and at least one transceiver network element,
  wherein at least a first control network element of said at least one control network element and at least a first transceiver network element of said at least one transmitter network element are connected via a first connection and a second connection, said first connection providing a higher guaranteed quality of service than the second connection, and the communications system is configured to transmit a piece of information using the first connection or the second connection using a predetermined criterion.

A third aspect of the present invention relates to a control network element for a communications system, said control network element being configured to provide a first interface and a second interface for information transmitted between the control network element and a transceiver network element, the first interface relating to a first connection and the second interface relating to a second connection, said first connection providing a higher guaranteed quality of service than the second connection, and use the first interface or the second interface for a piece of information transmitted between the control network element and the transceiver network element depending on a predetermined criterion.

A fourth aspect of the present invention relates to a transceiver network element for a communications system, said transceiver network element being configured to provide a first interface and a second interface for information transmitted between a control network element and the transceiver network element, the first interface relating to a first connection and the second interface relating to a second connection, said first connection providing a higher guaranteed quality of service than the second connection, and use the first interface or the second interface for a piece of information transmitted between the control network element and the transceiver network element depending on a predetermined criterion.

BRIEF DESCRIPTION OF THE DRAWINGS

Embodiments of the present invention will now be described by way of example only with reference to the accompanying drawings, in which.

DETAILED DESCRIPTION OF EMBODIMENTS OF THE INVENTION

Embodiments of the present invention are discussed below in detail, with many references to WCDMA system and to High Speed Downlink Packet Access (HSDPA). It is however appreciated that the present invention may be applicable also in other communications systems than in a system combining features of the WCDMA system and the HSDPA.

Figure 1:
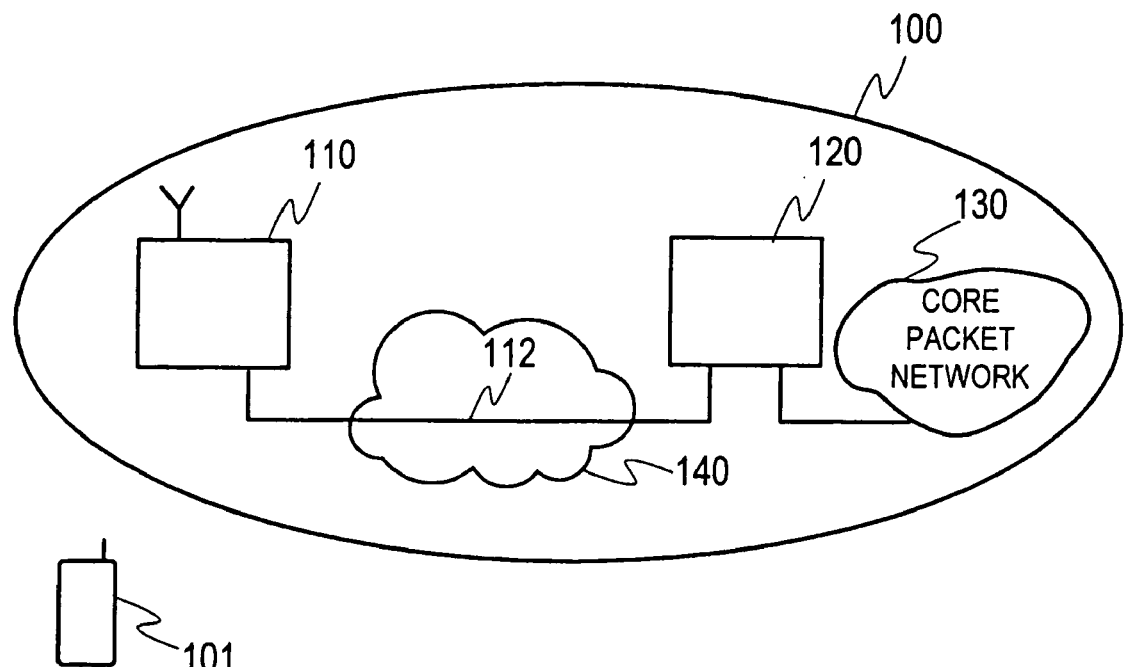
FIG. 1 shows, as an example, a communications system comprising a control network element and a transceiver network element.
Figure 2:
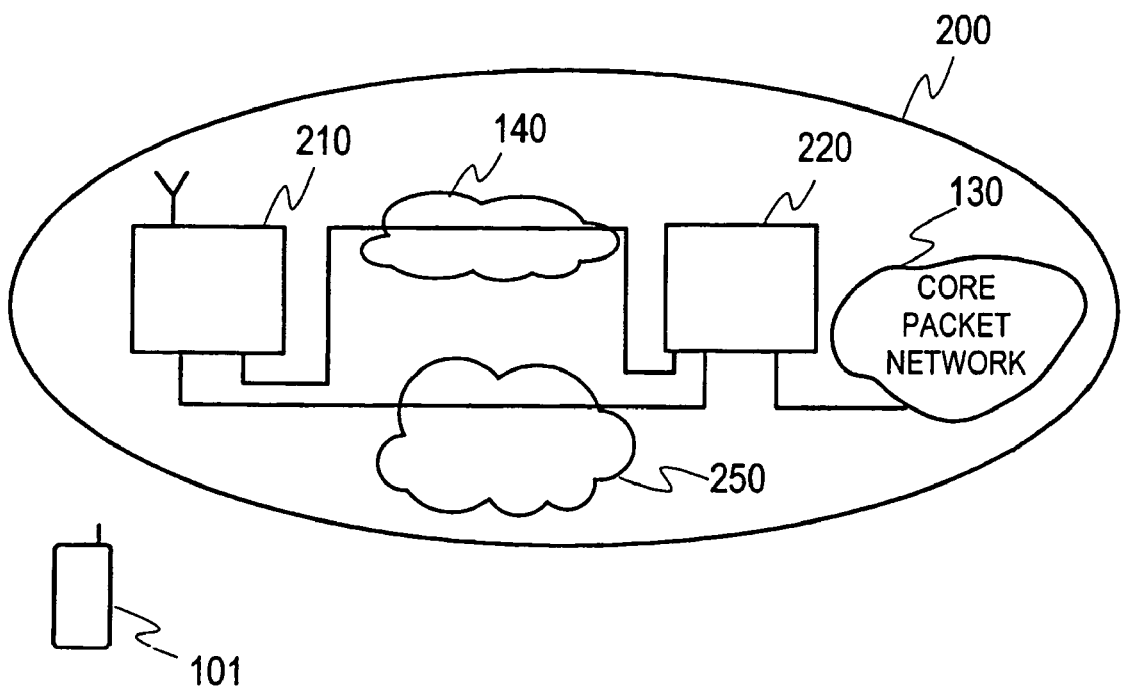
FIG. 2 shows, as an example, a communications system in accordance with an embodiment of the present invention.

FIG. 1 has been discussed above in connection with the background of the invention. FIG. 2 shows, as an example, a communications system 200 and a communications device 101. The communications system 200 in accordance with an embodiment of the invention is in FIG. 2 shown to be a cellular communications system. FIG. 2 shows a transceiver network element 210 responsible for transmitting and receiving information to a communications device 101. FIG. 2 shows also a control network element 220 responsible, for example, of radio resource allocation between a plurality of communications devices communicating via a same transceiver network element. For providing packet data transfer between the communications device 101 and a packet switched network (not shown in FIG. 2) to which the communications system 200 is connected, typically via a gateway network element, the control network element 220 is connected to a packet core network 130 of the communications system 200.

FIG. 2 shows further that the control network element 220 and the transceiver network element 210 are connected with a first connection 112 provided by a transmission network 140. As discussed above in connection with the background of the invention, this transmission network 140 may be, for example, a SDH network or a PDH network. A transmission network 140 applicable in embodiments of the invention preferably provides a constant transmission delay, without jitter. A transmission network 140 applicable in embodiment of the invention is thus typically a time division multiplexing network. A transmission network 140 applicable in embodiments of the invention may further provide a timing reference to the communications system. Providing a timing reference means that a transmission network 140 connecting a plurality of transceiver network elements to one or to a plurality of control network elements provides a timing reference at least for the transceiver network elements. Transceiver network elements typically need the timing reference for transmitting information at correct times in relation to each other.

FIG. 2 further shows that the transceiver network element 210 and the control network element 220 are connected to each other via a packet switched network 250. This packet switched network 250 may be owned by the cellular communications system operator, or the packet switched network 250 may be owned by a third party. The packet switched network 250 typically provides lower guaranteed quality of service for data transfer than the transmission network 140. Guaranteed quality of service refers here, for example, to a constant transfer delay between endpoints of a connection. Other important factors are a high connection reliability to ensure that, for example, signaling messages between the control network element and the transceiver network element do not get lost. Some transceiver network element implementations may need the E1 or T1 type connection to obtain reference system frame timing or even to obtain reference clock to ensure RF (radio frequency) frequency stability.

The connection between the control network element 220 and the transceiver network element 210 is here called a second connection, but it is appreciated that this second connection is a packet-switched connection and the second connection may actually refer to a number of separate packet data connections between the control network element 220 and the transceiver network element 210. Furthermore, it is appreciated that the first connection via the transmission network 140 may be implemented, for example, as a plurality of E1 connections or T1 connections. In many cases, however, it is sufficient to have only one E1 or T1 connection connecting a control network element 220 to a transceiver network element 210.

In general terms, the control network element 220 and the transceiver network element 210 each have two interfaces for transmitting packet data between the control network element 220 and the transceiver network element 210. A first interface relates to the first connection via the transmission network 140, and a second interface relates to the second connection via the packet switched network 250.

Considering the WCDMA and HSDPA as an example, the transceiver network element 210 is a base station (Node B) and the control network element 220 is a Radio Network Controller.

The HSDPA is supported by a new shared channel, High Speed Downlink Shared Channel HS-DSCH. Certain control features of this HS-DSCH are implemented at least partly in the base station for allowing fast adaptation to changing channel properties. These control features include, for example, transmission scheduling and link adaptation. Transmission scheduling refers to allocation of transmission resources between a plurality of users or connections. Link adaptation refers to changing, for example, modulation and channel coding rate. For the dedicated traffic channels, radio resource control and transmission scheduling is mostly implemented in a RNC in WCDMA. Transmission scheduling in a transceiver network element (in a base station) means that the data sent from a control network element (from a RNC) to be transmitted, for example, using the HS-DSCH channel is stored in the buffer in the transceiver network element, and thus the data does not necessary get transmitted immediately upon arrival. For data intended to be transmitted on a dedicated channel DCH similar buffering in the transceiver network element is typically limited to be small jitter compensation resulting from the E1 or T1 connection. Large delay variations cannot in general be tolerated for the dedicated traffic channels, as the mode of the transceiver network element operation on DCH typically expects to have data, for example, every 20 ms interval. The transceiver network element can not delay the transmission time instant due to DCH data not being available in time. If the DCH data is not available in time for encoding, the transceiver network element may use, for example, discontinuous transmission on DCH and discard the delayed data for the transmission instant.

It is therefore appreciated that the second connection may be used especially for information the transmission of which over the radio interface between a communications device and a transceiver network element is scheduled under the control of the transceiver network element.

Scheduling information for transmission over the radio interface in the transceiver network element may be applicable also for information transmitted in the uplink direction, from a communications device towards the communications system. Information sent on the existing DCH in the uplink typically cannot tolerate varying transport delay, as it is generally expected to arrive with constant interval to the control network element. The Enhanced Uplink DCH, which is a proposal by the Third Generation Partnership Project (3GPP), the data is sent by the terminal with uplink scheduling controlled in the transceiver network element. Information transmitted in the uplink using scheduling controller by the transceiver network element, for example information transmitted using the Enhanced Uplink DCH, thus can tolerate more delay variance in the transmission. The Enhanced Uplink DCH concept is also sometimes referred to as the High Speed Uplink Packet Access (HSUPA).

The HSDPA traffic has no requirement for constant delay from the transmission from the controlling network element to the reception of the data in the transceiver network element and further transmission over the air interface to a communications device. Respectively, in the uplink direction, the HSUPA traffic has no need for a base station (or multiple base stations in case soft handover) to have the data transmitted exactly at a certain time instant to the control network element. The base station controls scheduling of HSDPA or HSUPA data between the base station and the communications device. The base station therefore includes buffers for the scheduling. The HSDPA or HSUPA channels are not intended to carry traffic (such as normal speech calls) which needs constant delay and does not tolerate extra buffering in the base station. It is appreciated that there may be also other data having no requirement for constant transmission delay than HSDPA or HSUPA traffic.

Figure 3A:
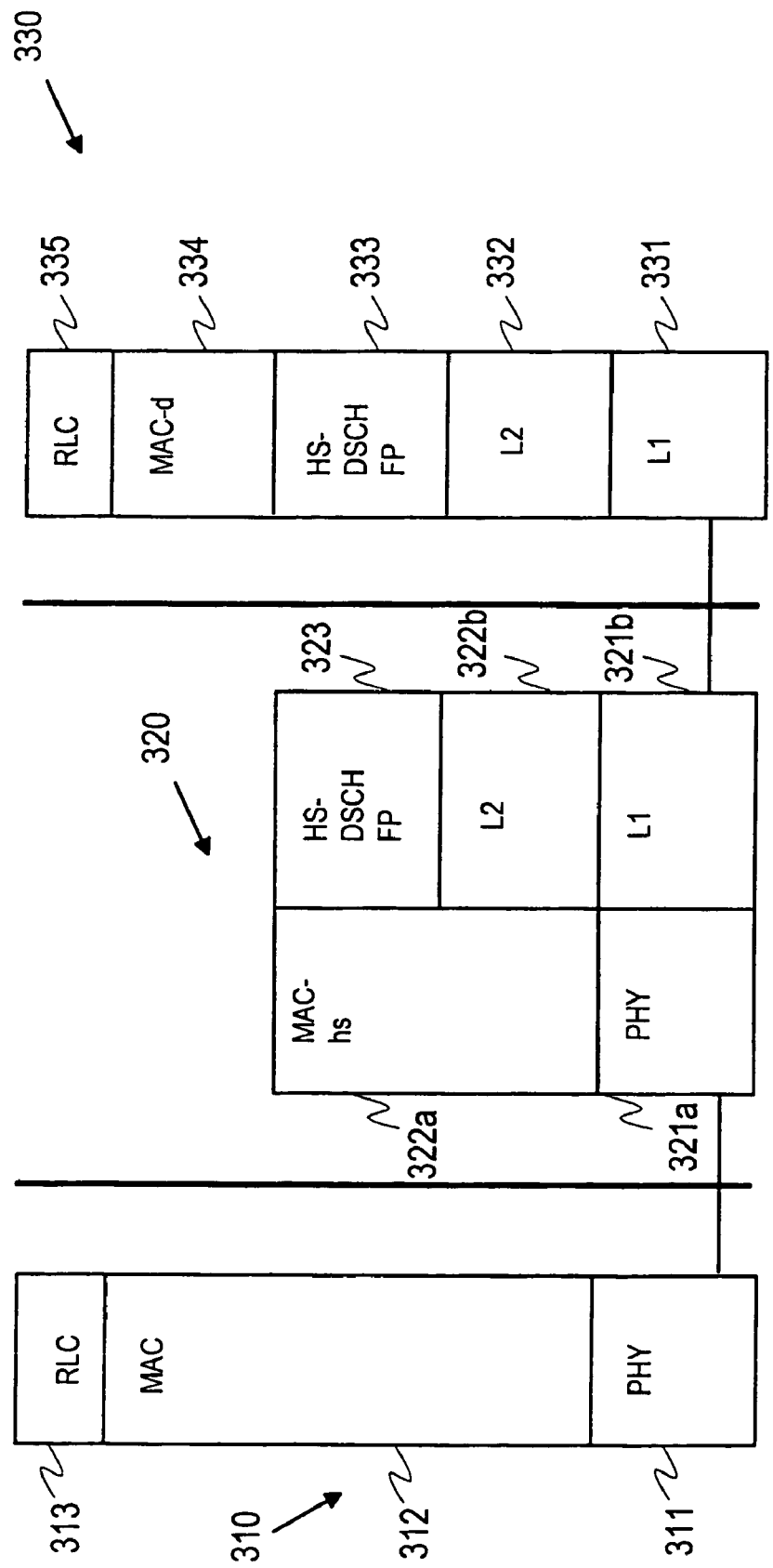
FIGS. 3a and 3b show, as examples, schematically protocol stacks relating to a communications device, transceiver network element and a control network element.
Figure 3B:
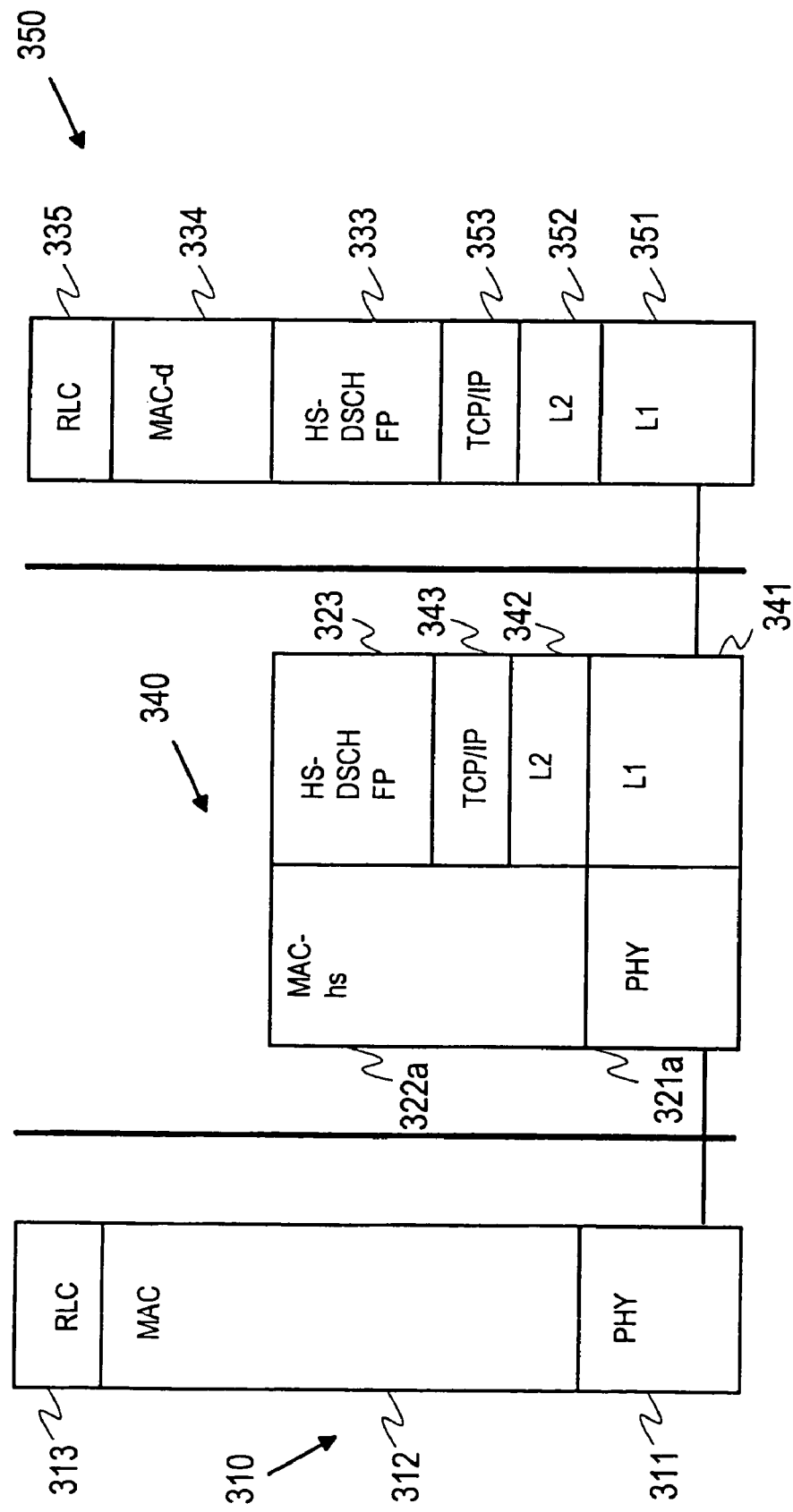

FIGS. 3a and 3b relate to FIG. 2, more particularly to HSDPA in WCDMA. FIGS. 3a and 3b show schematically protocol stacks of a communications device (user equipment), base station (Node B) and radio network controller for HSDPA. The protocol layer responsible for the HS-DSCH medium access control in the Node B is called MAC-hs. Between the Node B and the RNC, HS-DSCH frame protocol (FP) is used for transmitting HSDPA frames. In the RNC, the medium control layer for packet data MAC-d and the radio link layer RLC are the same for HSDPA and for packet data transfer using dedicated traffic channels DCH.

It is appreciated that the HSDPA is known to a person skilled in the art, and therefore details of HSDPA are not discussed in detail in this description. For example, details of deciding between using dedicated traffic channels or the shared HSDPA channel for downlink packet data transmission are irrelevant for embodiments of the present invention. Embodiments of the present invention relate more to the transmission of data between a control network element and a transceiver network element than to selecting a proper channel type for data transmission between a communications device and a control network element.

Details of HSDPA can be found, for example, in 3GPP technical specification TS 25.308, "High Speed Downlink Packet Access; Overall description; Stage 2; Release 5", version 5.5.0, or in the following book: "WCDMA for UMTS", edited by H. Holma and A. Toskala, published by John Wiley and Sons, $2^{nd}$ edition, 2002, Chapter 11, pp. 279-304.

FIG. 3a shows a protocol stack 310 relating to the communications device 101, a protocol stack 320 of the Node B 110 and a protocol stack 330 of the RNC 120. The protocol stacks 320 and 330 in FIG. 3a are applicable also to the first interface in the transceiver network element 210 and the control network element 220. The protocol stack 310 has three layers: a physical layer 311, a medium access control (MAC) layer 312 and a radio link control (RLC) layer 313. The protocol stack 320 has two layers towards the communications device 101: a physical layer 321a and a medium access control layer 322a. Towards the radio network controller 120 the Node B protocol stack 320 has the following layers: layer L1 321b, layer L2 322b and HS-DSCH frame protocol (HS-DSCH FP) 323. The protocol stack 330 has the following layers: layer L1 331, layer L2 332, HS-DSCH FP layer 333, medium access control layer MAC-d 334 and RLC layer 335.

It is appreciated that in HSDPA there may be two RNCs involved in a HSDPA connection: a serving RNC and a controlling RNC. It is possible that the controlling RNC is bypassed, and the HS-DSCH FP layer in the serving RNC has a counterpart in the Node B. This option is in line with FIG. 3a. A further option is to use the HS-DSCH FP between the serving RNC and the controlling RNC, and a medium access control protocol MAC-c/sh on top of the HS-DSCH FP between the Node B and the controlling RNC. FIG. 3a shows the protocol stack in a configuration without the MAC-c/sh layer.

In the example of FIG. 2, when the radio network controller 220 transmits HSDPA data to the Node B 110 via the transmission network 140, this HSDPA data transmission uses the protocol stacks shown in FIG. 3a. The L1 and L2 protocol layers in FIG. 3a provide features relating to the specific transmission network 140 connecting the Node B 210 and the radio network controller 220.

FIG. 3b shows a protocol stack 340 of the Node B 210 and a protocol stack 350 of the RNC 220. The protocol stacks 340 and 350 in FIG. 3b are applicable to the second interface in the transceiver network element 210 and the control network element 220.

Regarding the second interface, the transceiver network element 210 may be connected to the packet switched network 250, for example, by ADSL (Asymmetric Digital Subscriber Line) equipment. Alternatively, the transceiver network element 210 and the control network element 220 may be connected to the packet switched network 250 using HDSL (High data rate Digital Subscriber Line) equipment. As a further alternative, the packet switched network 250 may be, for example, Local Area Network (LAN) and the transceiver network element 210 and the control network element may be connected to the LAN network. The packet switched network 250 may be, for example, an Ethernet network.

Regarding the protocol stacks relating to the second interface, the protocol stacks 340 and 350 in the Node B and in the RNC in FIG. 3b are similar to those shown in FIG. 3a. The L1 layer 341 in the protocol stack 340 and the L1 layer 351 in the protocol stack 350 relate to the physical medium connecting the transceiver network element and the control network element. The L2 layer 342 and the L2 layer 352 relate to the medium access control protocol in the packet switched network 250. On top of the medium access control protocol there are some packet data protocols, for example, the User Datagram Protocol over Internet Protocol (UDP/IP) or the Transfer Control Protocol over Internet Protocol (TCP/IP). FIG. 3b shows, as an example, the TCP/IP combination as the protocol layer 343, 353. The HS-DSCH frame protocol 323, 333 is carried on top of protocols for transmitting packet data received from the core packet network 130 to a communications device or vice versa. The headers of HS-DSCH frames contain information indicating, for example, scheduling priority and a flow header. Based on the flow header, the transceiver network element (or, in the uplink direction, the controller network element) can determine to which communications device the HS-DSCH frame relates.

The packet switched network 250 may be used also in the uplink direction for transmitting data from the transceiver network element 210 to the control network element 220.

Figure 4:
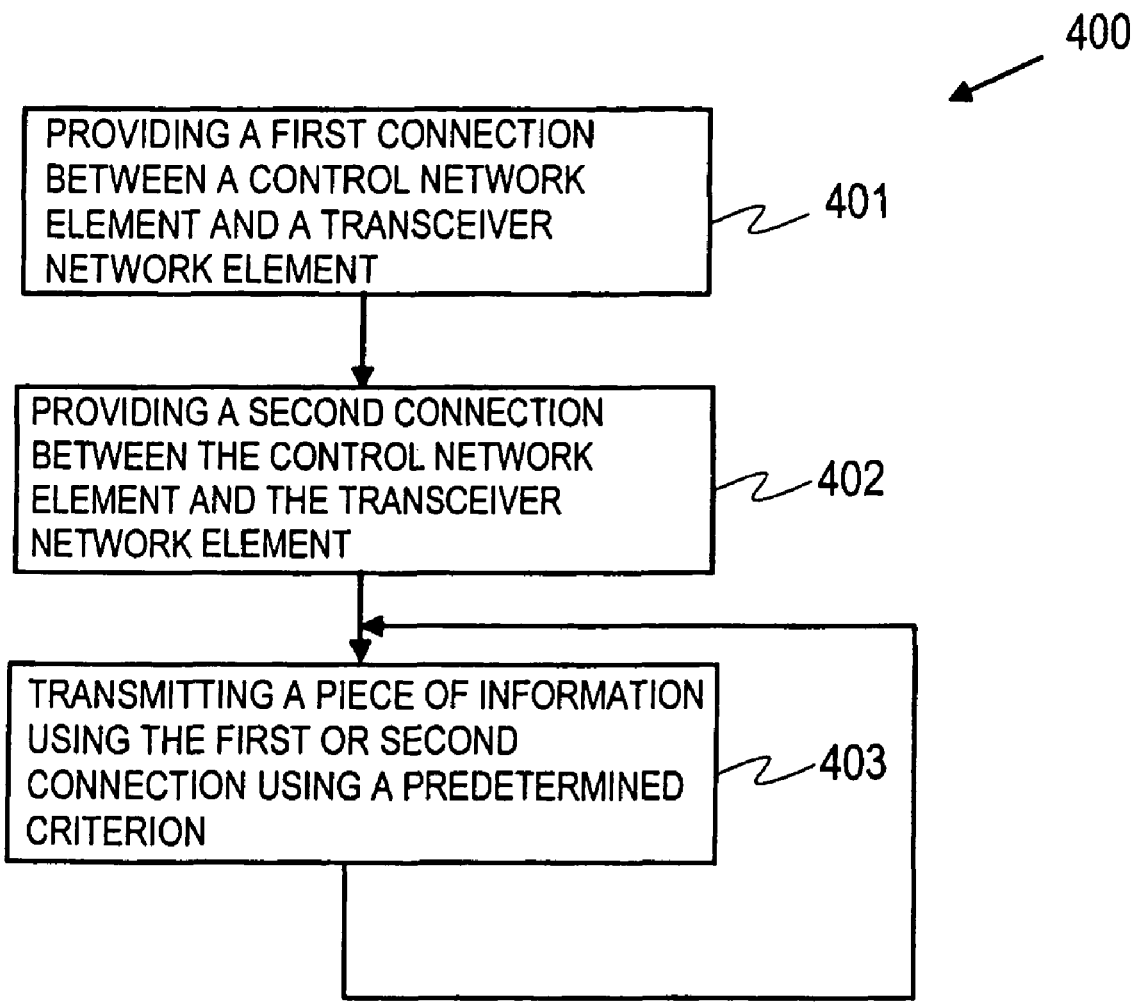
FIG. 4 shows, as an example, a flowchart of a method in accordance with an embodiment of the invention.

FIG. 4 shows, as an example, a flowchart of a method 400 in accordance with an embodiment of the invention. The method 400 is a method for transmitting information between a control network element and a transceiver network element in a communications system. In step 401, a first connection is provided between the control network element and the transceiver network element. In step 402, a second connection is provided between the control network element and the transceiver network element. The first connection provides a higher guaranteed quality of service than the second connection. The operator of the communications system 200 may provide the communication system 200 with the first and second connection by, for example, obtaining connectivity services from third parties.

In step 403, a piece of information is transmitted using the first connection or the second connection using a predetermined criterion. There may be, for example, a separate step for selecting a connection for a piece of information using predetermined criteria. The selection of the connection for a piece of information may be performed, for example, by the network element transmitting the piece of information over the first connection or the second connecting. As a second example, the control network element may be responsible for selecting the connection for a piece of information transmitted in the uplink direction and for a piece of information transmitted in the downlink direction.

As mentioned above, the piece of information handled in the method 400 may be a data packet to be transmitted to communications devices using such a channel type, e.g. HS-DSCH, where scheduling is controlled by the base station. Alternatively, the information handled in the method 400 could be uplink data where terminal transmission rate and instant is as well under the control of the transceiver network element, and data is then respectively to be transmitted from the transceiver network element to the control network element. The information handled in the method 400 may comprise control information transmitted between the control network element and the transceiver network element or between the control network element and a communications device. This control information may relate to the HSDPA or it may be any other control information to control the transceiver network element or the communications device.

Figure 5:
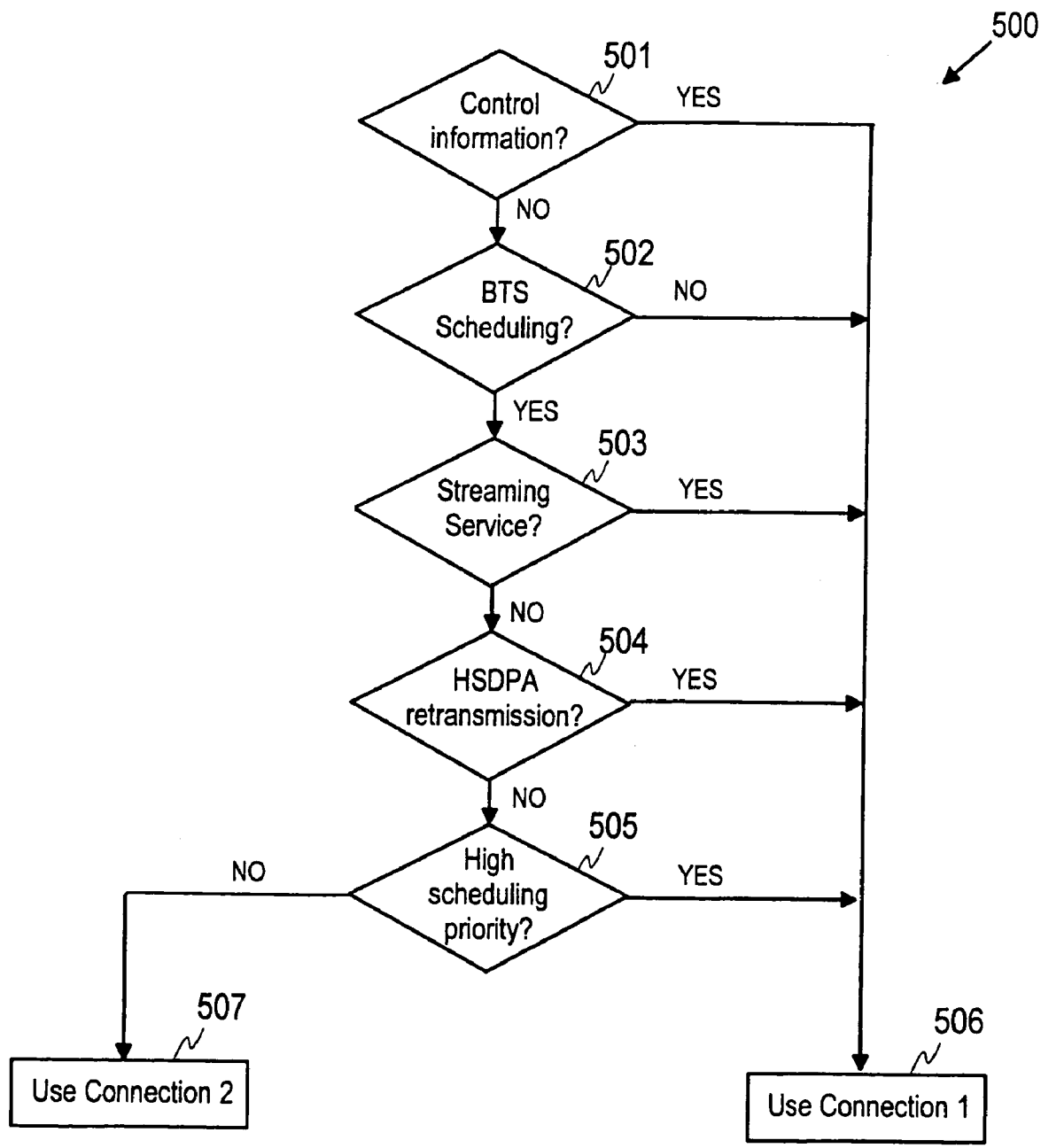
FIG. 5 shows, as an example, a flowchart of a further method in accordance with a further embodiment of the invention.

In the following some criteria for selecting a connection for the piece of information to be transmitted to the transceiver network element are discussed in more detail. FIG. 5 shows a flowchart of a method 500 in accordance with a further embodiment of the invention, where a number of criteria are used. It is appreciated that any suitable combination of the different criteria shown in FIG. 5 may be used. For example, any one of the checking steps shown in FIG. 5 may be used as a single criterion for dividing information between the first connection and the second connection. Furthermore, it is possible to change the order of the steps.

In step 501, it is checked whether a current piece of information is control information between the control network element and the transceiver network element or control information between the control network element and a communications device. Control information is transmitted using the first connection having the higher guaranteed quality of service (step 506). Also control information relating to the HSDPA may be transmitted using the first connection, even when user data relating to the HSDPA is transmitted using the second connection. In step 502 it is checked if the current piece of information is to be transmitted to the communications device using scheduling in the transceiver network element. It is appreciated that for most dedicated channel data transmissions, the control network element is responsible for scheduling. Regarding HSDPA, the transceiver network element may be responsible for scheduling, for example, for allowing fast adaptation to changing channel properties. (In other words, for allowing, for example, transmission with a high data rate to a communications device when the communications device has good channel properties.) If the current piece of information is to be scheduled in the transceiver network element, it is transmitted to the transceiver network element using the second connection (step 507). Typically all information to be scheduled for transmission in the transceiver network element may be transmitted using the second connection.

In some embodiments, any information transmitted using the shared packet data channel may be transmitted using the second connection. In the method 500, however, in step 503 it is checked whether the packet data using a shared channel relates to a streaming service or otherwise requires a guaranteed transmission rate or a guaranteed transfer delay and delay variance. A piece of information relating to a streaming service may be transmitted using the first connection, which is typically more reliable than the second connection. Background HSDPA traffic, that is packet data using a shared channel and having no specific delay requirements, may be transmitted using the second connection.

In step 504, it is checked whether the current piece of information is a retransmission, especially if it is a HSDPA retransmission. Typically lower protocol layers between the transceiver network element and a communications device handle retransmissions, but occasionally these re-transmissions may fail and a medium access control entity in the control network element (or in the control network element) needs to perform retransmission. These retransmissions may be made using the first connection (step 506).

In step 505 it is checked whether the packet data using the shared channel has high scheduling priority. Should this be the case, the first connection may be used. Otherwise, the packet data using the shared channel may be transmitted using the second connection. In other words, scheduling priority may be taken into account in deciding whether to transmit a piece of information using the first connection or the second connection.

In addition or as an alternative to the various checking steps shown in FIG. 5, it is possible to use the capacity of the first connection to the full extent and then to use for the remaining packet data the second connection.

It is appreciated that although FIG. 5 shows the method 500 as a single method, various checking steps may be implemented in different protocol entities in the control network entity.

In the following some specific alternatives are discussed for selecting a connection for information to be transmitted between the control network element and the transceiver network element. A first alternative is to direct HSDPA traffic on the second connection and to direct other traffic on the first connection. A second alternative is to direct all traffic that is scheduled for transmission in the transceiver network element to the second connection (cf. step 502). This second alternative is possible also for uplink traffic from the transceiver network element to the control network element. A third alternative is to use the capacity of the first connection to the full extent and then put packet data (in other words, data that tolerates delay variations possibly caused the scheduling in the transceiver network element) on the second connection.

A fourth alternative is to direct HSDPA data (or other data scheduled for transmission under control of the transceiver network element) for the first transmission (from the RNC point of view) for the second connection, and if there are RLC retransmissions from the RNC, direct there retransmissions to the first connection (cf. step 504). A fifth alternative is to direct HSDPA background traffic to the second connection and to direct streaming services, even if the streaming services are using HSDPA, to the first connection (cf. steps 502, 503). A sixth alternative is to divide HSDPA data on the first and second connections based on scheduling priority information, so that HSDPA data with higher scheduling priority uses the more reliable first connection (cf. step 505). A seventh alternative is that HSDPA control information is mapped on the first connection and other HSDPA information is mapped on the second connection (cf. step 501).

It is appreciated that connecting the control network element 220 and the transceiver network entity 210 using the transmission network 140 and using the packet switched network 250 provides advantages over connecting the control network element 220 and the transceiver network element 210 using only the packet switched network 250. One advantage is that the timing reference provided by the transmission network 140 is available to the transceiver network element 210.

Figure 6:
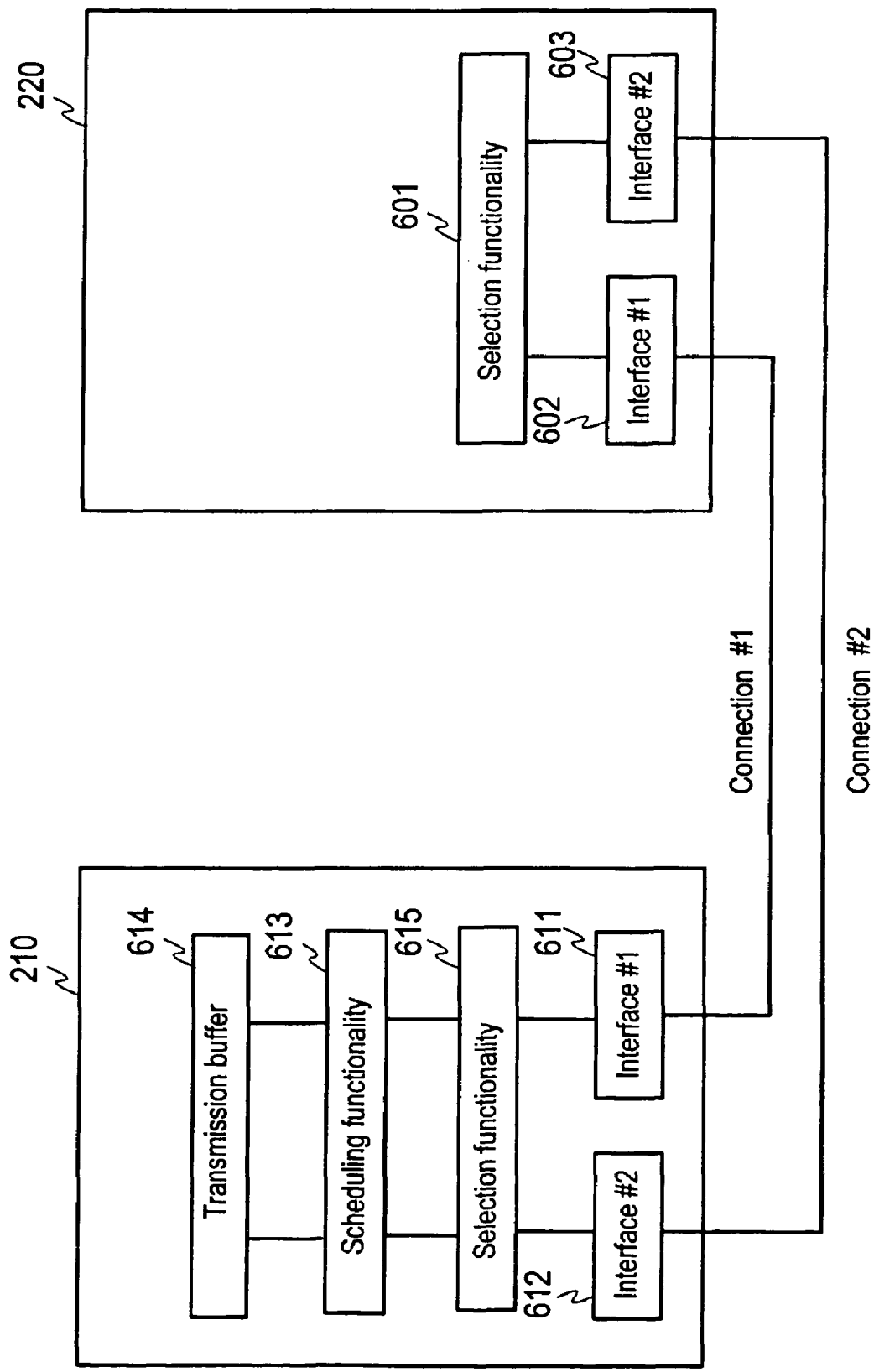
FIG. 6 shows, as examples, schematically a control network element and a transceiver network element in accordance with an embodiment of the invention.

FIG. 6 shows, as an example, a schematic block diagram of a control network element 220 and a transceiver network element 210. The control network element 220 may comprise a selection functionality 601 for selecting a connection for a piece of information to be transmitted to the transceiver network element 210. The selection functionality 601 may implement, for example, the method 500 or a variation thereof. The selection functionality is connected, typically using a suitable protocol layer and protocol handling entities (not shown in FIG. 6), to a first interface 602 relating to the first connection and to a second interface 603 relating to the second connection. The first interface 602 and the second interface 602 are operably connected to the respective connections.

As discussed above, the selection functionality 601 may relate only to packet data using a shared channel. In this case, the first connection is typically used for all other data to be transmitted between the control network element 220 and the transceiver network element 210. As a specific example, the first connection is typically used for packet data to be transmitted to communications devices using dedicated channels.

The transceiver network element 210 comprises a first interface 611 relating to the first connection and a second interface 612 relating to the second connection. The first interface 611 and the second interface 612 are operably connected to the respective connections. The transceiver network element 210 may comprise a scheduling functionality 613 in for scheduling the information to be transmitted between the transceiver network element and a communications device, for example, using the shared packet data channel. The scheduling functionality 613 typically takes as input information to be transmitted using the shared packet data channel and received from the first interface 611 and from the second interface. The transceiver network element 210 comprises typically also a transmission buffer 614 for buffering at least information the transceiver network element is scheduling. Scheduled information to be transmitted, for example, using the shared packet data channel is directed to the transmission buffer 614. Scheduled information is transmitted from the transmission buffer 614 to the communications devices.

It is clear to a person skilled in the art that if the second connection is used for other information than for packet data using a shared packet data channel, information received using the second interface 612 needs to be directed to proper transmission buffers or to entities responsible for processing the received information.

It is appreciated that the selection functionality 601 in the control network element may select the connections for uplink and/or downlink data. Similarly, the transceiver network element may comprise selection functionality 615. This selection functionality 615 may select connections for uplink and/or downlink data, but typically this selection functionality 615 is responsible for selecting connections for uplink data. The transceiver network element 210 may, for example, select connections for those pieces of information that are scheduled to be transmitted between a communications device and the transceiver network element 210 under the control of the transceiver network element. It is appreciated that any of the examples of selecting connections for pieces of information in connection with FIG. 5 may be implemented in the selection functionality 601, 615.

It is appreciated that although the description gives an E1 connection as an example of the first connection, the present invention may be applicable to situations, where the first connection between the control network element and the transceiver network element is provided by a plurality of E1 connections or other connections via a transmission network. Also in these situations transmitting information via a second connection over a packet switched network provides at least the advantage of allowing use of a packet switched network when the capacity allocated for use in the transmission network is not sufficient.

It is also possible that the transceiver network element and the control network element are connected to each other, in parallel, via more than one packet switched network. As mentioned above, the second connection may refer to a plurality of packet data connections. It is appreciated that the term second connection covers also a plurality of packet data connections, where, for example, some packet data connections are provided via a first packet switched network and other packet data connections are provided via a second packet switched network. It is evident to a skilled person that in this case selecting the second connection for a piece of information may be followed by a selection between the different available packet switched networks.

It is furthermore appreciated that in addition to using the second connection for transmitting information from the control network element to the transceiver network element, it is possible to use the second connection also for transmitting information in the uplink direction. Transmitting information in the uplink direction using the second connection is especially suitable for information transmission scheduled by the transceiver network element.

It is appreciated that although the WCDMA system and the HSDPA are discussed above in detail, the invention may be applicable to other communications system. The invention may be applicable especially in a communications system providing dedicated traffic channels and special channels for packet data, the packet data channels providing higher transmission capacity than the dedicated traffic channels and having scheduling implemented at least partly in the transceiver network element. Information to be transmitted on the dedicated traffic channels may be transmitted using the first connection providing a higher guaranteed quality of service, and information to be transmitted on the packet data channels may be transmitted using the second connection. As the transmission scheduling for the packet data channel is at least party implemented in the transceiver network element, non-constant transmission delays or possible retransmissions over the second connection are not crucial.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
causing provision of a first connection connecting a control network element and a transceiver network element, the first connection being provided by a transmission network;
causing provision of a second connection connecting the control network element and the transceiver network element, the second connection being provided by a packet switched network and the first connection having a higher guaranteed quality of service than the second connection;
selecting at least one of the first connection and the second connection for a piece of information; and
directing transmission of the piece of information using the selected at least one of the first connection and the second connections;
wherein the first connection is selected for data which cannot have a transmission instant from the transceiver network element delayed, and wherein the second connection is selected for data which is to be scheduled by the transceiver network element; and
wherein the control network element comprises a radio network controller and the transceiver network element comprises a base station.

2. The method as defined in claim 1, wherein the directing transmission comprises using the second connection for at least one piece of information to be scheduled for transmission between a communications device and the transceiver network element under control of the transceiver network element.

3. The method as defined in claim 1, wherein the directing transmission comprises using the first connection for transmitting speech information between the control network element and the transceiver network element.

4. The method as defined in claim 1, wherein the directing transmission comprises using the first connection for transmitting information relating to packet data channels dedicated to communications devices.

5. The method as defined in claim 1, wherein the directing transmission comprises using the first connection for at least one piece of control information.

6. The method as defined in claim 1, wherein the directing transmission comprises using the first connection for at least one piece of retransmitted information.

7. The method as defined in claim 1, wherein the directing transmission comprises using the second connection for at least one piece of information relating to a shared packet data channel.

8. The method as defined in claim 1, wherein the directing transmission comprises using the first connection for at least one piece of information having at least one of transmission rate and transfer delay requirements.

9. The method as defined in claim 1, wherein the directing transmission comprises taking into account scheduling priority relating to the piece of information.

10. The method as defined in claim 1, wherein the directing transmission comprises using the first connection if there is available capacity in the first connection.

11. A method as defined in claim 1, wherein causing provision of the first connection comprises causing provision of the first connection in a time division multiplexing network.

12. The method as defined in claim 1, further comprising: providing a timing reference for the transceiver network element with the first connection.

13. The method as defined in claim 1, further comprising: selecting at least one of the first connection and the second connection for the piece of information in the control network element.

14. The method as defined in claim 1, wherein the transmission network provides at least one fixed connection between the control network element and a transceiver network element.

15. The method as defined in claim 14, wherein the at least one fixed connection comprises at least one leased line.

16. An apparatus, comprising:
a controller configured to cause provision of a first interface and a second interface for information transmitted between the apparatus and a transceiver network element, the first interface relating to a first connection connecting the apparatus and the transceiver network element and the second interface relating to a second connection connecting the apparatus and the transceiver network element, said first connection providing a higher guaranteed quality of service than the second connection, wherein said first connection is provided by a transmission network and said second connection is provided by a packet switched network; and
a processor configured to select at least one of the first interface and the second interface for a piece of information using a predetermined criterion and configured to use the selected at least one of the first interface and the second interface for the piece of information transmitted between the apparatus and the transceiver network element depending on the predetermined criterion, wherein the first interface is selected for data which cannot have a transmission instant from the transceiver network element delayed, and wherein the second interface is selected for data which is to be scheduled by the transceiver network element, wherein the apparatus comprises or is embodied on a radio network controller, and wherein the transceiver network element comprises a base station.

17. The apparatus as defined in claim 16, wherein the predetermined criterion comprises using the second connection for at least one piece of information to be scheduled for transmission between a communications device and the transceiver network element under control of the transceiver network element.

18. The apparatus as defined in claim 16, wherein the predetermined criterion comprises using the first connection for transmitting information relating to packet data channels dedicated to communications devices.

19. The apparatus as defined in claim 16, wherein the predetermined criterion comprises using the first connection for at least one piece of control information.

20. The apparatus as defined in claim 16, wherein the predetermined criterion comprises using the first connection for at least one piece of retransmitted information.

21. The apparatus as defined in claim 16, wherein the predetermined criterion comprises using the second connection for at least one piece of information relating to a shared packet data channel.

22. The apparatus as defined in claim 16, wherein the predetermined criterion comprises using the first connection for at least one piece of information having at least one of transmission rate and transfer delay requirements.

23. The apparatus as defined in claim 16, wherein the predetermined criterion comprises taking into account scheduling priority relating to the piece of information.

24. The apparatus as defined in claim 16, wherein the first connection is provided by a time division multiplexing network.

25. The apparatus as defined in claim 16, wherein the first connection provides a timing reference for the transceiver network element.

26. The apparatus as defined in claim 16, wherein the radio network controller comprises a control network element for a cellular communications system.

27. The apparatus as defined in claim 26, wherein the apparatus comprises a radio network controller for a Wideband Code Division Multiple Access (CDMA) system.

28. An apparatus, comprising:
a controller configured to cause provision of a first interface and a second interface for information transmitted between a control network element and the apparatus, the first interface relating to a first connection connecting the apparatus and the control network element and the second interface relating to a second connection connecting the apparatus and the control network element, said first connection providing a higher guaranteed quality of service than the second connection, wherein said first connection is provided by a transmission network and said second connection is provided by a packet switched network, and
a processor configured to select at least one of the first interface and the second interface for a piece of information using a predetermined criterion and configured to use the selected at least one of the first interface and the second interface for the piece of information transmitted between the control network element and the apparatus depending on the predetermined criterion, wherein the first interface is selected for data which cannot have a transmission instant from the apparatus delayed, and wherein the second interface is selected for data scheduled by the apparatus, wherein the apparatus comprises or is embodied on a base station, and wherein the control network element comprises a radio network controller.

29. The apparatus as defined in claim 28, said apparatus being further configured to schedule the piece of information for transmission to a communications device.

30. The apparatus as defined in claim 28, said apparatus comprising a base station for a cellular communications system.

31. The apparatus as defined in claim 28, said base station comprising a Node B for a Wideband Code Division Multiple Access (CDMA) system.

32. An apparatus, comprising:
means for causing provision of a first interface and a second interface for information transmitted between the apparatus and a transceiver network element, the first interface relating to a first connection connecting the apparatus and the transceiver network element and the second interface relating to a second connection connecting the apparatus and the transceiver network element, said first connection providing a higher guaranteed quality of service than the second connection, wherein said first connection is provided by a transmission network and said second connection is provided by a packet switched network; and
means for selecting at least one of the first interface and the second interface for a piece of information using a predetermined criterion and for using the selected at least one of the first interface and the second interface for the piece of information transmitted between the apparatus and the transceiver network element depending on the predetermined criterion, wherein the first interface is selected for data which cannot have a transmission instant from the transceiver network element delayed, and wherein the second interface is selected for data which is to be scheduled by the transceiver network element, wherein the apparatus comprises or is embodied on a radio network controller, and wherein the transceiver network element comprises a base station.

33. An apparatus, comprising:

means for causing provision of a first interface and a second interface for information transmitted between a control network element and the apparatus, the first interface relating to a first connection connecting the apparatus and the control network element and the second interface relating to a second connection connecting the apparatus and the control network element, said first connection providing a higher guaranteed quality of service than the second connection, wherein said first connection is provided by a transmission network and said second connection is provided by a packet switched network; and means for selecting at least one of the first interface and the second interface for a piece of information using a predetermined criterion and for using the selected at least one of the first interface and the second interface for the piece of information transmitted between the control network element and the apparatus depending on the predetermined criterion, wherein the first interface is selected for data which cannot have a transmission instant from the apparatus delayed, and wherein the second interface is selected for data scheduled by the apparatus, wherein the apparatus comprises or is embodied on a base station, and wherein the control network element comprises a radio network controller.

34. A method, comprising:

causing provision of a first interface and a second interface for information transmitted between a control network element and a transceiver network element, the first interface relating to a first connection and the second interface relating to a second connection, said first connection providing a higher guaranteed quality of service than the second connection, wherein said first connection is provided by a transmission network and said second connection is provided by a packet switched network; and selecting at least one of the first interface and the second interface for a piece of information using a predetermined criterion and using the selected at least one of the first interface and the second interface for the piece of information transmitted between the control network element and the transceiver network element depending on the predetermined criterion;

wherein the first interface is selected for data which cannot have a transmission instant from the transceiver network element delayed, and wherein the second interface is selected for data scheduled by the transceiver network element; and wherein the control network element comprises a radio network controller and the transceiver network element comprises a base station.

* * * * *

UNITED STATES PATENT AND TRADEMARK OFFICE
CERTIFICATE OF CORRECTION

| | | |
|---|---|---|
| PATENT NO. | : 8,009,652 B2 | Page 1 of 1 |
| APPLICATION NO. | : 10/927489 | |
| DATED | : August 30, 2011 | |
| INVENTOR(S) | : Toskala | |

It is certified that error appears in the above-identified patent and that said Letters Patent is hereby corrected as shown below:

Column 12
Line 18, "connections;" should read --connection;--.

Signed and Sealed this
Second Day of October, 2012

David J. Kappos
*Director of the United States Patent and Trademark Office*